United States Patent [19]

Saurenman

[11] 4,326,454
[45] Apr. 27, 1982

[54] ION TREATMENT ENHANCEMENT

[75] Inventor: Donald G. Saurenman, Cerritos, Calif.

[73] Assignee: Consan Pacific Incorporated, Whittier, Calif.

[21] Appl. No.: 251,275

[22] Filed: Apr. 6, 1981

Related U.S. Application Data

[63] Continuation of Ser. No. 81,774, Oct. 4, 1979, abandoned, which is a continuation-in-part of Ser. No. 13,786, Feb. 21, 1979, Pat. No. 4,250,804, which is a continuation-in-part of Ser. No. 893,003, Apr. 3, 1978, abandoned.

[51] Int. Cl.³ ............................ A23L 3/32; A23B 4/04
[52] U.S. Cl. .......................................... 99/451; 99/475; 99/477; 99/481; 361/225; 361/230
[58] Field of Search .......................... 99/451, 473–476, 99/477, 481; 426/235, 236, 314, 315; 361/225, 229, 230, 213, 231

[56] References Cited

U.S. PATENT DOCUMENTS

| | | |
|---|---|---|
| 1,480,573 | 1/1924 | Smith . |
| 2,043,217 | 6/1936 | Yaglou . |
| 2,231,324 | 2/1941 | Cromfton, Jr. . |
| 2,264,495 | 12/1941 | Wilner . |
| 2,565,454 | 8/1951 | MacKenzie et al. . |
| 2,585,799 | 2/1952 | Lawrence . |
| 2,641,804 | 6/1953 | Klein . |
| 2,765,975 | 10/1956 | Lindenblad . |
| 2,844,478 | 7/1958 | Hanley et al. . |
| 3,106,884 | 10/1963 | Dalve et al. . |
| 3,203,809 | 8/1965 | Visness et al. . |
| 3,308,344 | 3/1967 | Smith et al. . |
| 3,311,108 | 3/1967 | Cristofv et al. . |
| 3,324,515 | 6/1967 | West . |
| 3,358,289 | 12/1967 | Lee . |
| 3,396,703 | 8/1968 | Trussell . |
| 3,483,672 | 12/1969 | Jahnke . |
| 3,711,710 | 1/1973 | Wright ................................. 361/230 |
| 3,739,246 | 6/1973 | Haas ..................................... 361/225 |
| 3,757,491 | 9/1973 | Gourdine . |
| 3,818,269 | 6/1974 | Stark .................................... 361/231 |
| 3,870,946 | 3/1975 | Sandorf . |
| 4,072,762 | 2/1978 | Rhodes .................................. 99/451 |

FOREIGN PATENT DOCUMENTS 1028351 5/1966 United Kingdom .

Primary Examiner—Philip R. Coe
Assistant Examiner—Timothy F. Simone
Attorney, Agent, or Firm—William W. Haefliger

[57] ABSTRACT

Ion treatment of objects, such as edibles, is enhanced.

28 Claims, 12 Drawing Figures

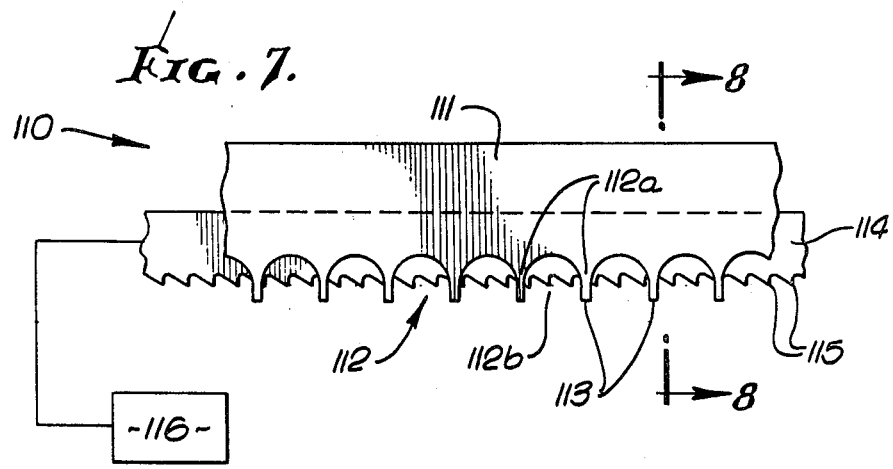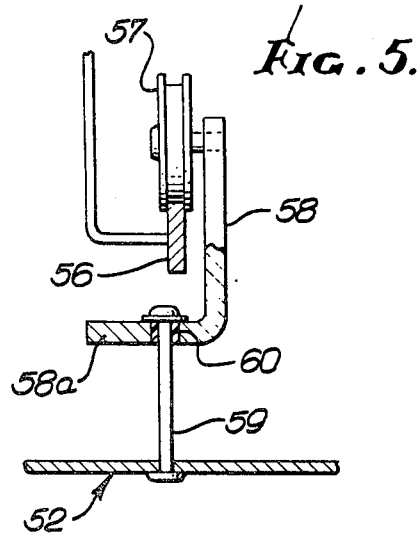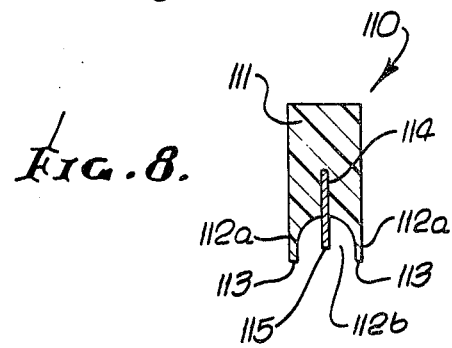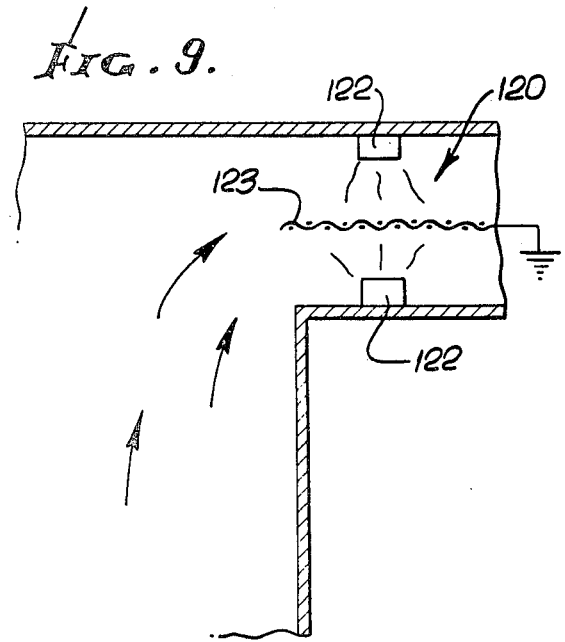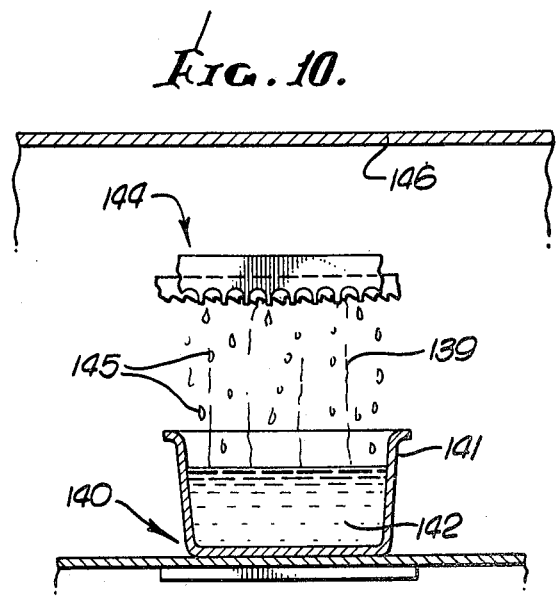

ION TREATMENT ENHANCEMENT

BACKGROUND OF THE INVENTION

This is continuation, of application Ser. No. 81,774 filed Oct. 4, 1979, abandoned, which is a continuation-in-part of my prior application Ser. No. 13,786, filed Feb. 21, 1979, U.S. Pat. No. 4,250,804, which was a continuation-in-part of Ser. No. 893,003, filed Apr. 3, 1978, abandoned.

This invention relates generally to enhanced ion treatment of objects, and more particularly concerns method and apparatus to more efficiently effect smoke treatment of edibles, for example.

There are certain objections and disadvantages associated with conventional smoke treatment of consumables such as meat. Among these are the length of curing time required for adequate exposure of the meat to the smoke which fills the enclosure wherein the meat is supported; the cost of hardwood or other fuel required to produce such smoke; and the pollution of the outside air to which the smoke is vented. While certain proposals have been made toward alleviating these problems, none to my knowledge has provided the unusual advantages associated with the present invention, as will appear. Among these are reduced smoke exposure time; reduced smoke and fuel requirements; greatly reduced pollution; and great simplicity of use.

SUMMARY OF THE INVENTION

It is a major object of the invention to provide method and apparatus which will alleviate the described problems, as well as provide the referenced advantages. The basic method of the invention, and with reference to treatment of objects in general, includes the steps:

(a) dispersing electrically charged ions in a generally forward direction and from a localized dispersing zone, (b) providing a surface substantially larger than said localized zone and providing distributed electrostatic charge at said surface and of the same polarity as said ions, and (c) locating said surface in such proximity to said dispersing zone as to enhance the forward dispersing of said ions from said zone.

As will be seen, the surface is typically located to face generally forwardly and to extend sidewardly of the ion dispersing zone; the ion dispenser or dispensers may be supported on an extended carrier, such as a plate, that defines the electrostatically charged surface; an extended metallic surface, typically grounded, may be associated with the carrier, to enhance the electrostatic charging of the carrier surface; and the metallic surface may be defined by the wall of a smoke chamber.

Further steps of the method, as applied to smoke treatment of edibles, include:

(c) supporting the edible on a support in a smoke zone, (d) dispersing the charged ions into the smoke with the ions carrying an electrical charge of a polarity causing smoke particles to be attracted to the edible, and (e) maintaining the edible at an electrical potential aiding attraction of the smoke particles to the edible.

Since the smoke particles are attracted to the edible, such as meat, less smoke and fuel are required, and less exposure time is needed. Also there is less smoke pollution of air released from the smoke zone.

As will be seen, negatively charged ions are typically dispersed into the smoke, and the meat typically has an initial charge more positive than that of the ions; the meat may be electrically grounded or positively charged; the ions may be dispersed into flowing streams of smoke; and the smoke may be caused to circulate.

Further objects include the provision of an elongated or extended means to dispense ions, and which is usable along walls, ceilings, etc; and the dispensing of ions into vapor rising from edibles or cooking zones to prevent vapor collection on surfaces and drip back into the cooking zone or onto the edibles.

These and other objects and advantages of the invention, as well as the details of illustrative embodiments, will be more fully understood from the following description and drawings, in which:

DRAWING DESCRIPTION

FIG. 5 is an enlarged section on lines 5—5 of FIG. 4;

FIG. 7 is a side elevational view of another form of ion dispenser;

FIG. 8 is a vertical section taken on lines 8—8 of FIG. 7;

FIG. 9 is a fragmentary view of a smoke house outlet, with provision for entrapment of smoke particles;

FIG. 10 is a view showing prevention of steam collection on a ceiling above a cooking or chilling area;

DETAILED DESCRIPTION

Figure 1:
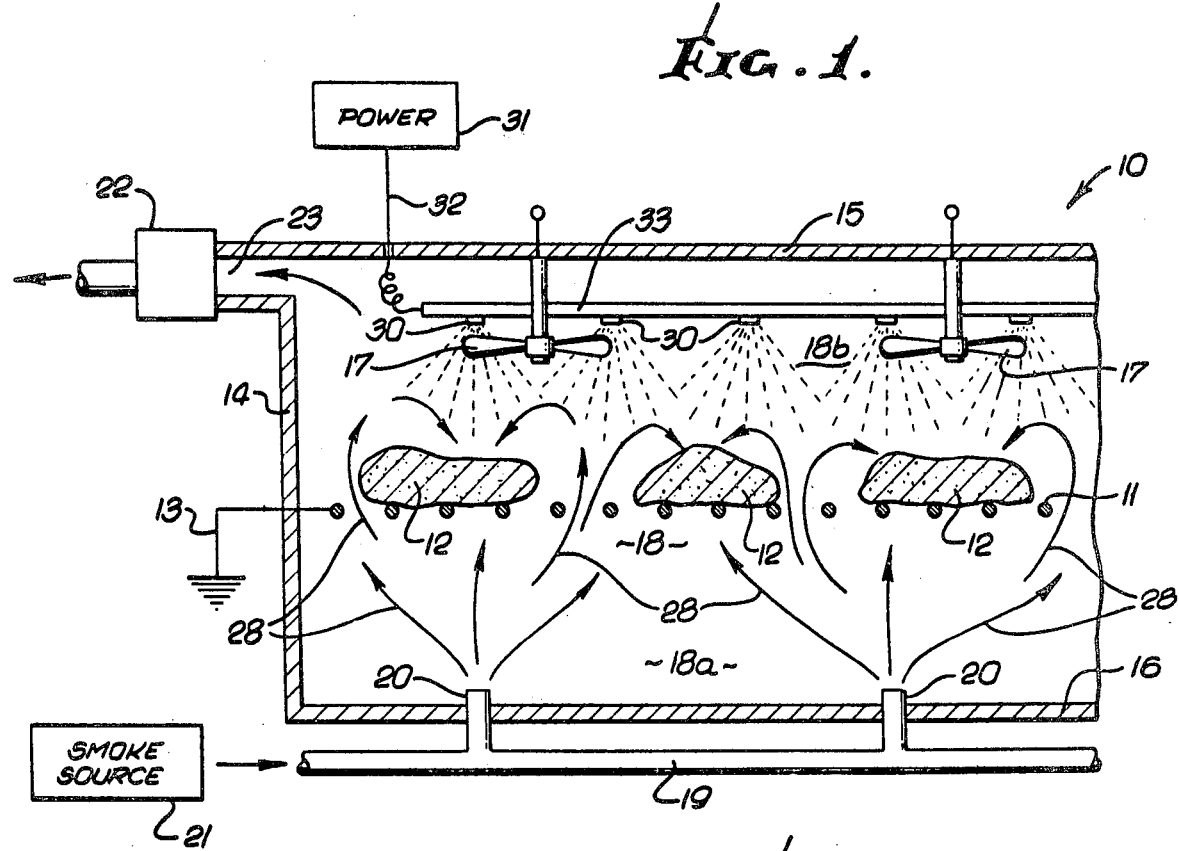
FIG. 1 is a side elevation of a smoke house interior.

In FIG. 1, a smoke house or enclosure 10 contains a support such as a metallic rack or grate 11 on which bodies of meat (or other consumables) 12 are supported. The rack may be suitably electrically grounded, as indicated at 13; alternately, the smoke house walls 14 may be grounded, and the metallic rack or grate connected to such walls. The house also typically includes a roof 15 and a floor 16, and fans 17 may be located in the interior zone 18 to cause smoke to thoroughly circulate about the meat bodies for intimate contact therewith.

Smoke may be delivered to the interior 18 as via a duct 19 with outlets 20 spaced along the floor, i.e. beneath the rack 11, so that smoke rises under and toward the meat. A suitable smoke source is indicated at 21, connected with duct 19. Outlet 23 from zone 18 serves to deliver excess smoke to the exterior via damper valve 22. In the past, such excess smoke escape was considered objectionable, as constituting a source of pollution, as well as a cost item.

Electrically charged ions are dispersed or dispensed into the smoke particles, with the ion charge causing the smoke particles to be attracted onto the consumables or edibles, such as the meat. In this regard, the ions typically carry negative charge, which is imparted to the smoke particles causing them to be attracted to the meat, the latter initially having an electrical charge or charges which is or are more positive than that of the dispersed ions. Thus, for example, the meat may be effectively grounded because of its contact with grounded grate or rack 11.

In FIG. 1, the smoke is dispersed into a lower region 18a of zone 18 below the edibles, to rise in currents 28 (as induced by fans 17) against the undersides of the meat bodies, and between the meat bodies, into the upper region 18b of zone 18 whereby the ions are dispersed. As a result, the smoke particles in zone 18b then are attracted back downwardly toward and onto the meat, whereby the meat becomes effectively smoke treated much more rapidly than in the past where ion treatment was not employed.

The means to disperse charged ions into the smoke is shown to include ion dispensers 30 spaced generally horizontally and in upper zone 18b above the meat. Such dispensers may include multiple tips, as for example are disclosed in my U.S. Pat. No. 3,976,916 issued Aug. 24, 1976. A power source at 31 for delivering high voltage to the tips or needles may be as disclosed in U.S. Pat. No. 3,308,344. Between 2,000 and 50,000 volts DC are typically applied to the tips, as via a cable 32 that extends through conduit 33.

Inasmuch as the smoke particles are attracted to the meat or edibles, very little if any excess smoke requires venting at outlet 23, smoke pollution is effectively eliminated, and minimum smoke is required, saving expense. Also, the smoke treatment time for the edibles is minimized.

Figure 2:
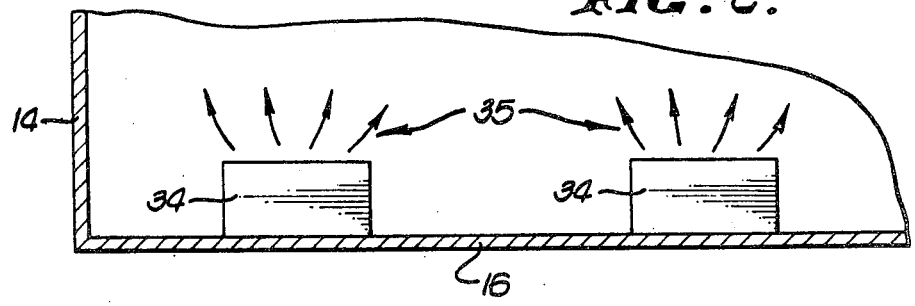
FIG. 2 is a side elevation of a modified lower portion of the FIG. 1 smoke house interior.

In FIG. 2, the smoke source is shown to comprise wood chips above burners, each burner and chip unit being indicated at 34. Rising smoke is indicated at 35.

Figure 3:
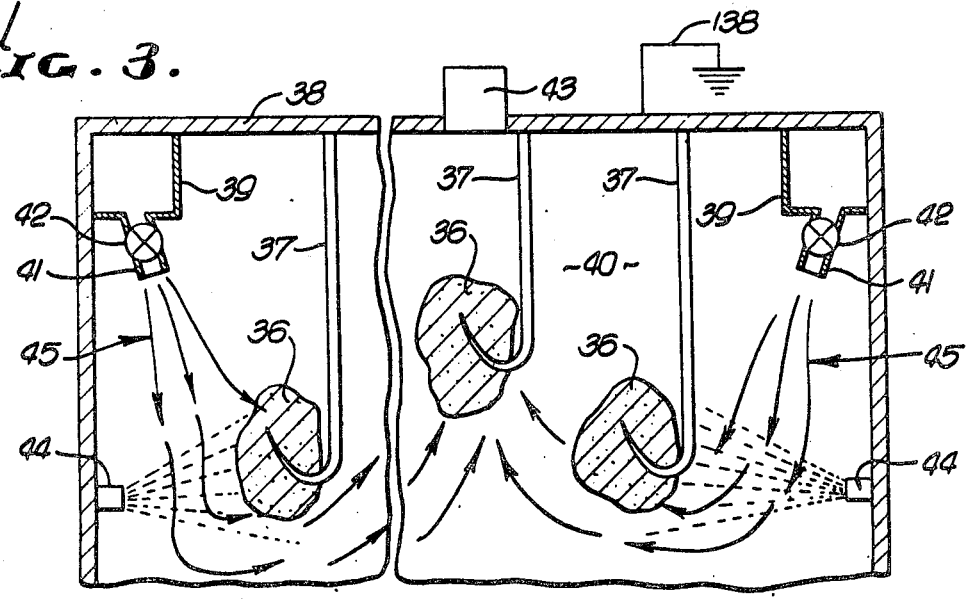
FIG. 3 is a side elevation of a further modification of a smoke house interior.

In FIG. 3, the meat 36 is suspended by metal hooks and bars, indicated generally at 37. These are suspended from the metallic ceiling 38, grounded at 138.

Smoke is delivered via flues 39 at multiple locations as for example the opposite upper corners of the interior zone 40. The flues have outlets at 41, which are valve damper controlled as at 42. A vent appears at 43. The two dampers may, if desired, be alternately opened, to achieve smoke flow in opposite directions across the interior 40, for treatment of the meat.

The ion dispensers 44 are located lower than the flues so as to dispense ions into the smoke currents indicated as flowing downwardly and sidewardly at 45, generally toward the hook suspended meat. Accordingly, the smoke particles become negatively charged, and are attracted toward the meat.

Further, either negative or positive ions may be produced to be dispersed as described. Also, negative ions may first be dispersed to negatively charge the edibles. Then, positive ions may be dispersed to attract the smoke onto the negatively charged edibles. The reverse may also be done.

Figure 4:
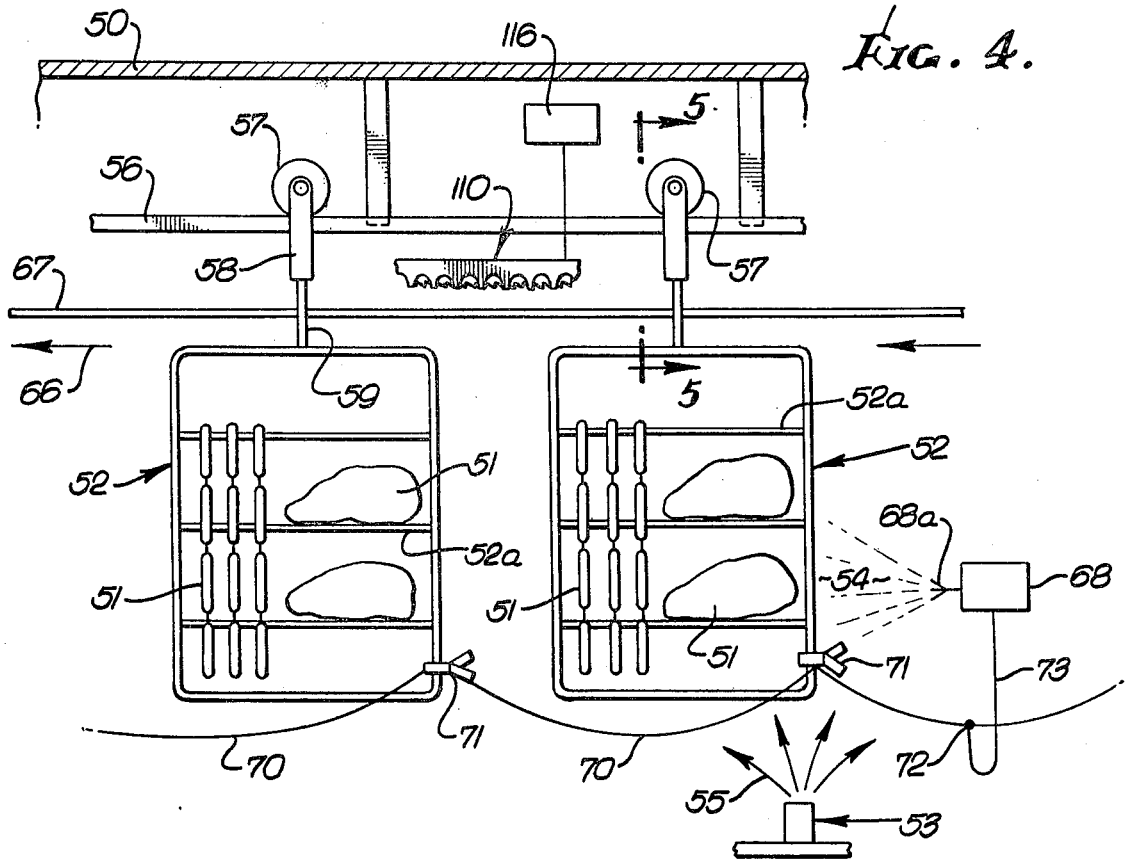
FIG. 4 is a side elevation of a modified ion treatment and edible grounding arrangement.

Referring to FIG. 4, smoke house or enclosure 50 contains means supporting multiple edibles 51, such as meat for example. The support means is shown as a metallic carriage 52 with metal supports 52a for the edibles. Smoke source 53 delivers liquid smoke, or smoke from a wood chip or sawdust or other fire, to the carriage traverse zone 54, arrows 55 indicating such delivery. Smoke may be produced outside the smoke house and then blown into the smoke house. The support means is shown as movably supported on a rail 56, and for that purpose wheels or rollers 57 move along the rail, and support brackets 58 which extend under the rail at 58a. Upward extensions 59 of the carriages extend through insulative tubular fittings 60. The latter extend vertically through the bracket extensions 58a, and support the carriage extensions, as shown. Therefore, the carriages are electrically insulated from the rail 56. As another alternative, the rail 56 may be electrically insulated from its support structure. These are examples, only. Means to advance the supports 52 to the left, as indicated by arrows 66, may include a pull line 67 attached to the supports, or other means.

Means is provided to disperse charged ions into the smoke and into zone 54, with the ions carrying an electrical charge of a polarity causing smoke particles to be attracted to the edibles. Such means is indicated at 68, and may take the form of the devices 30 or 44 previously described. The ion dispensing needles appear at 68a. The emitters may be at or near the floor, or at various levels above the floor.

Means is also provided for maintaining the edibles at an electrical potential or potentials aiding attraction of the smoke particles to the edibles, for enhancing efficiency of smoke deposition, whereby less smoke delivery is needed (less smoke is wasted), the exposure time duration of the edibles to the smoke streams is reduced; and less, pollution of air escaping to the interior results. Such means, in FIG. 4, takes the form of structure electrically grounding the edibles, as via the supports 52 for example. Thus, an electrically conductive metallic cable 70 is advantageously employed, and is clipped into firm contact with the metallic supports 52 via alligator clips 71. The cable itself travels along with the supports by virtue of its suspension therefrom, and it may be grounded as by connection at 72 to a slack return line 73 connected to the return or "ground" terminal of the circuitry 68. The latter terminal is typically positive if the ions dispensed are of negative polarity. Line 73 is slack so as to be free to travel with cable 70 as the latter travels along its looping path. Other type ground connections to cable 70 may be employed.

Figure 6:
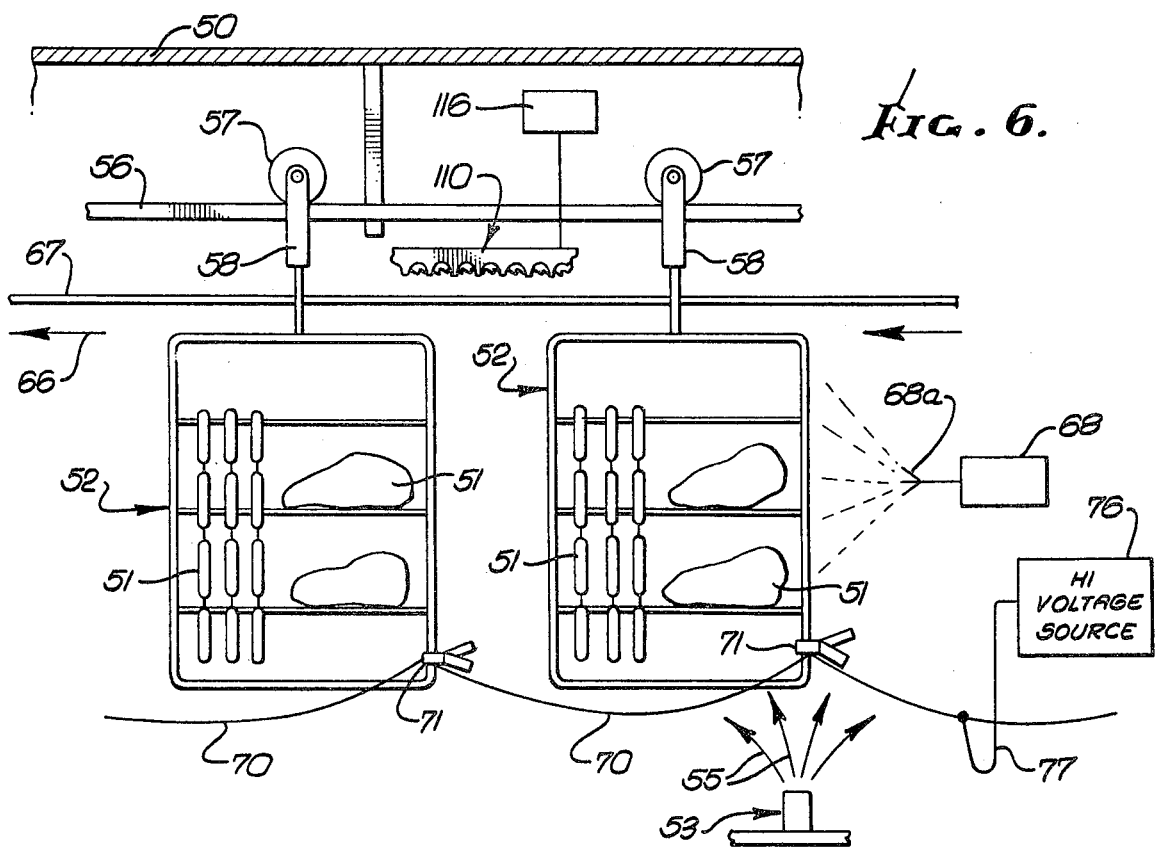
FIG. 6 is a side elevation of yet another ion treatment and edible charging arrangement.

FIG. 6 is like FIG. 4, and to that extent it employs the same identifying numerals. Of difference in FIG. 6 is the employing of circuitry 76 electrically connected to the edible (as via slack line 77, cable 70 and supports 52) to impart an electrical charge thereto, of a polarity opposite to that of the ions, to aid attraction of the charged smoke particles to the meat or edibles. Thus, a charge or potential between 2,000 and 50,000 volts is typically used, and preferably about 14,000 to 19,000 volts produces best results for meat. That voltage is positive when the ions are of negative polarity.

Any of various well known circuits may be used to provide the high voltage of source 76.

Examples of meat bodies and other edibles to be smoked are sausage, pork, ham, frankfurters, bacon, beef, chicken, turkey, fish, etc., others also being treatable.

The invention reduces the amount of wood smoke required on the product, and thereby reduces the bitter taste caused by tar and reduces possible cancer forming agents deposited on the product by smoke. Also, smoke pollution near smoke houses is reduced, and the need for pollution control equipment is thereby reduced.

FIGS. 4, 7 and 8 also illustrate an alternative or auxiliary means 110 for dispersing charged ions into the smoke, the ions carrying an electrical charge of a polarity causing smoke particles to be attracted to the edible. As shown in FIGS. 7 and 8, the means 110 includes an elongated insulative plastic strip 111 defining a groove or channel 112 which opens at one side direction, facing away from the strip. The flanges 112a of the channel contain multiple side opening 112b, separated by protective prongs 113 which are closely spaced to prevent finger entry into the channel. A narrow electrical conductive metallic strip 114 is originally mounted to the strip 111 to project into the channel, as shown. The strip 114 is serrated to define multiple pointed tips 115 exposed in the channel, to dispense positive or negatively charged ions when the strip is electrically charged by high voltage source 116, corresponding to sources 68 or 76. Serrated strip 114 may take the form of a metallic saw blade, which is gold plated for electrical conductivity.

In FIG. 4, the means 110 is directed downwardly toward the carriages 52 and edibles 51. Therefore, vapor or steam particles rising from the edibles are caused to coalesce by virtue of dispensed ion contact therewith, to drop down to the floor of the smoke house. This prevents vapor collection or condensation on the ceiling of the smoke house and subsequent dripping down onto the edibles which is highly objectionable as being unsanitary. Accordingly, the means 110 serves two functions, i.e. prevention of drip from the ceiling, and also causing attraction of smoke particles of the edibles, as described.

FIG. 9 shows an arrangement to prevent remanent smoke escape to the exterior via outlet or flue 120 from the smoke house. Smoke passing into the flue, as indicated by arrows 121 is subjected to contact with charged ions dispensed by devices 122 above and below a grounded screen 123. Therefore, the charged ions and smoke particles are then attracted to screen 123, preventing their escape. A smoke house may then be cleared of remanent smoke without producing external pollution, and so that the edible supports or racks may be accessed for edible removal or rack cleaning.

In FIG. 10, vapor or steam 139 rising from a chill or cook area 140 (as for example a pot 141 of boiling liquid 142) is prevented from reaching ceiling by means 144 the same as described above at 110. Coalesced steam droplets 145 drop back down, by gravity, preventing steam reaching the ceiling 146, and thus preventing resultant drip from the ceiling.

Figure 11:
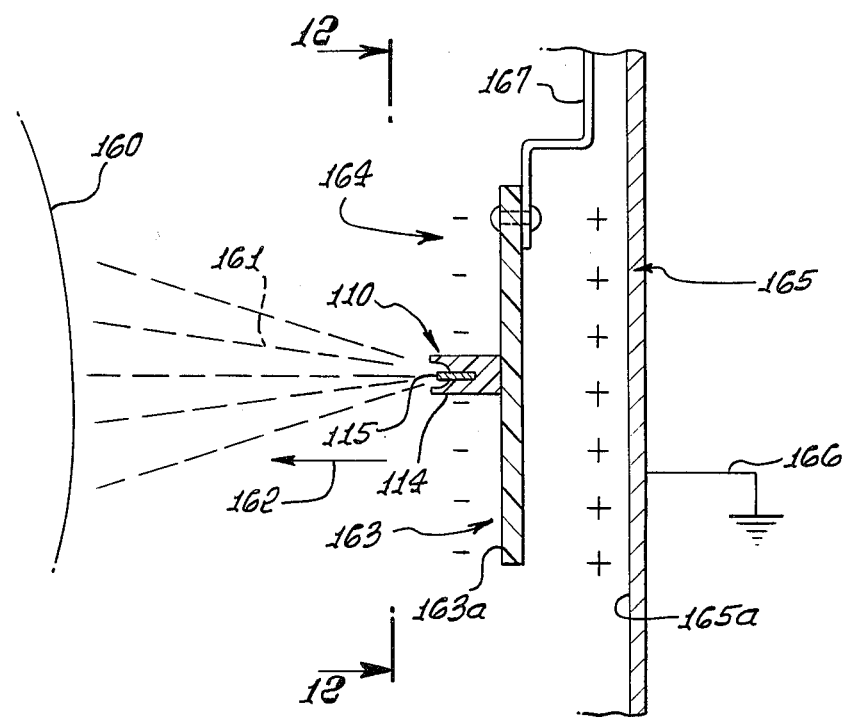
FIG. 11 is a side elevation showing the provision of enhancement means to enhance dispersing of the ions.
Figure 12:
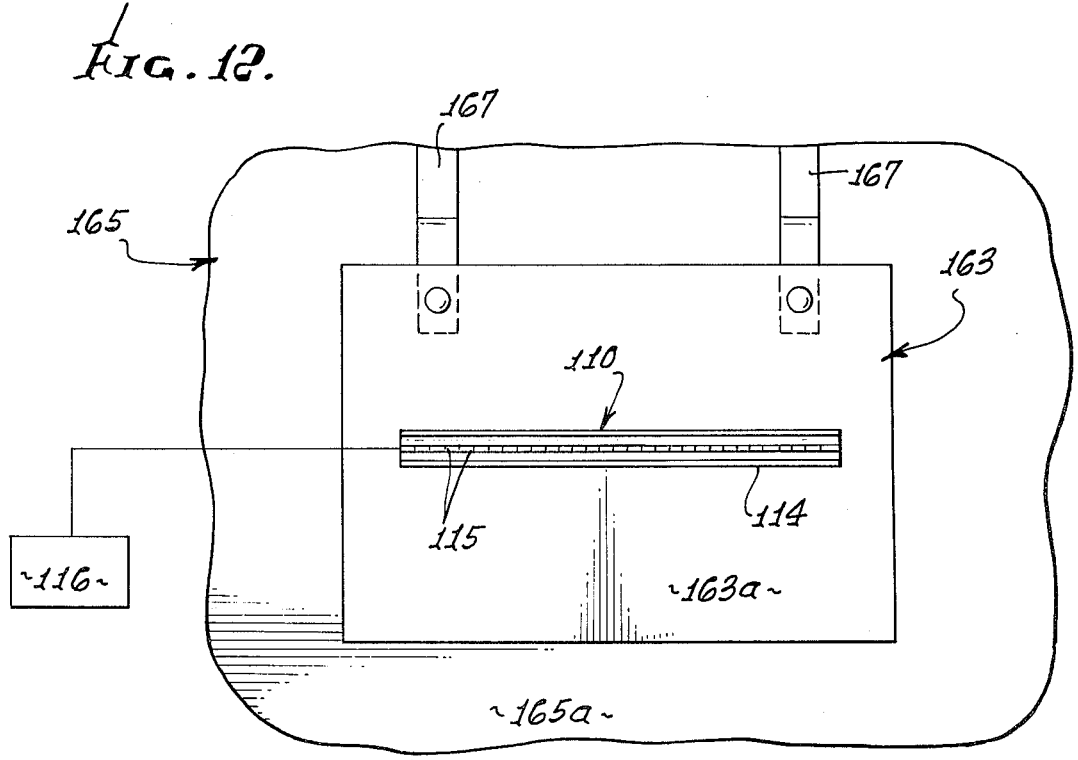
FIG. 12 is a frontal elevation of the FIG. 11 enhancement means.

FIG. 11 illustrates the provision of apparatus for enhancing ion treatment of objects 160 as for example edibles as described above. Means is there provided for dispersing electrically charged ions (as at 161) in a generally forward direction (shown by arrow 162), and from a localized dispersing zone. Such means may take the form of means 110 described above, and correspondingly labeled in FIGS. 11 and 12. Ions of negative polarity, for example, are dispersed from the zones defined by the serrated tips 115.

The elongated plastic strip or bar 114 that carries the metallic strip defining tips 115 is in turn supported by a carrier plate 163 made of electrically insulative material such as plastic (PVC for example). It defines an extended surface 163a on which distributed electrostatic charge collects. Thus, for example, negative charge collects on forward facing surface 163a, as indicated at 164, i.e. the charge has the same polarity as the ions 161. Further, surface 163a is located in such proximity to the ion dispersing zone as to enhance the forward dispersing or traveling of the ions, toward objects 160. It is believed this enhancement effect is due to electrostatic repulsion as between the ions and the charge built up on the carrier plate 163. Accordingly, the ion treatment of the objects, as for example by causing smoke collection on edible surfaces, is substantially enhanced. Surface 163*a* may be metallized, if desired.

The above effect is further promoted or aided by the location of carrier plate 163 in forwardly spaced, proximate relation to an extended metallic surface indicated at 165*a*. The latter is typically provided by the metallic wall 165 of a smoke house, wall 165 being effectively grounded at 166. It is believed electrical charge of opposite polarity builds up on surface 165*a* opposite the plate 163, to promote build-up of negative charge on the latter as discussed. A suitable hanger or bracket 167 suspends the plate 163 as from the smoke house ceiling, so that surfaces 163*a* and 165*a* are generally parallel and sufficiently close together as to create and maintain the ion enhancement effect.

It is believed negative charge builds up at 164 as a result of initial negative ion delivering from tips 115; also it is believed that charge 164 remains due to the capacitive effect with opposite polarity charge at surface 165*a*.

Multiple dispensers 114 and plates 153 may be employed, in the smoke zone.

I claim:

1. In apparatus for enhancing ion treatment of objects, the combination including (a) means for (i) dispersing smoke particles in a zone wherein the objects are located, (ii) and for inducing smoke particle flow to contact exposed undersides of the objects, and to flow around and above the objects, (b) means including a source of high voltage and multiple pointed tips to which said voltage is applied for forwardly dispersing charged ions into the smoke flowing upwardly above the objects with the ions carrying an electrical charge or charges causing smoke particles to be attracted back downwardly onto upper sides of the objects, (c) and metallic structure having local contact with exposed underside portions of the objects, said structure imparting a potential to the objects to cause said smoke particles into which ions have been dispersed to be attracted to the upper sides of the objects, (d) said tips arranged in spaced apart groups and pointed generally toward the objects so that the ions being dispersed enhance smoke particle flow onto the objects, (e) said metallic structure including metallic surface structure supporting the objects, said surface structure being electrically conductive, and (f) the smoke being dispersed by said first means into a lower region of said zone lower than the objects, and the ions are dispersed by said tips into an upper region of said zone higher than the objects, said smoke particle flow inducing means located in and openly exposed in said zone to displace the smoke and ions above the levels of the objects, and in directions and at rates sufficient to enhance smoke particle flow onto the objects, (g) and means forming a surface located in rearward proximity to said tips to provide distributed electrostatic charge at said surface and of the same polarity as said ions, thereby to enhance the forward dispersing of said ions.

2. The apparatus of claim 1 wherein said ion dispersing means is located to disperse ions into vapor rising from edibles to cause coalescing of vapor particles into droplets that gravitate downwardly.

3. The apparatus of claim 1 wherein said metallic structure is grounded for electrically grounding the objects.

4. The apparatus of claim 1 wherein the metallic structure is movably supported on a rail.

5. The apparatus of claim 1 wherein the metallic structure is movably supported on a rail which is itself supported by fixed support structure, and said rail is electrically insulated from said fixed support structure.

6. The apparatus of claim 1 including a ground cable connected to said metallic structure.

7. The apparatus of claim 1 including circuitry electrically connected to the object to impart an electrical charge thereto of a polarity opposite to that of said ions.

8. The apparatus of claim 1 including an elongated strip of insulative material forming a channel receiving an elongated metallic strip forming said tips spaced along the length of the metallic strip.

9. The apparatus of claim 1 wherein said smoke zone is surrounded by an enclosure having an outlet, said enclosure having an associated extended metallic surface spaced rearwardly from said surface forming means.

10. The combination of claim 1 wherein said surface is located to face generally forwardly and to extend generally sidewardly of said zone.

11. The combination of claim 10 wherein said surface is insulative.

12. The combination of claim 10 including means forming a smoke containing zone and edibles in said zone to be smoke treated, said means for dispersing charged ions including an elongated strip of insulative material, an elongated metallic strip associated with said insulative strip, and multiple metallic tips projecting from said metallic strip toward said edibles, said surface at which said distributed charge is provided also facing said edibles.

13. The combination of claim 10 wherein said surface forming means comprises a carrier supporting said ions dispersing means.

14. The combination of claim 13 including an extended metallic surface associated with said carrier, said carrier located in generally forwardly spaced relation to said metallic surface.

15. The combination of claim 14 wherein said carrier comprises a plate consisting of insulative material, said plate extending generally parallel to said extended metallic surface.

16. The combination of claim 1 wherein the ions are employed in smoke treatment of an edible, and including
 (d) means supporting the edible in a smoke zone,
 (e) said charged ions carrying an electrical charge of a polarity causing smoke particles to be attracted to the edibles, and
 (f) means for maintaining the edible at an electrical potential aiding attraction of the smoke particles to the edibles.

17. The apparatus of claim 16 wherein said smoke zone is surrounded by an enclosure having an outlet, said enclosure having an associated extended metallic surface spaced rearwardly from said surface forming means.

18. The apparatus of claim 16 wherein said last named means includes circuitry electrically connected to the edible to impart an electrical charge thereto of a polarity opposite to that of said ions.

19. The apparatus of claim 18 wherein said circuitry includes means to supply positive voltage between 2,000 and 50,000 volts to said edibles.

20. The apparatus of claim 16 wherein said ion dispersing means comprises an elongated strip of insulative material, and an elongated metallic strip carried by the channel and having multiple tips spaced along the length of the metallic strip, said tips exposed in a channel formed by the insulative strip.

21. The apparatus of claim 20 wherein said insulative strip has opposed flanges at opposite sides of the channel, said flanges containing side openings therethrough and spaced therealong, said surface forming means comprising an electrically insulative body associated with said channel.

22. The apparatus of claim 16 wherein said last named means includes structure electrically grounding the edible.

23. The apparatus of claim 16 wherein said last named means includes structure electrically grounding the edible support means which is electrically conductive.

24. The apparatus of claim 23 wherein the support means is movably supported on a rail, and said support means is electrically insulated from the rail.

25. The apparatus of claim 23 wherein the support means is movably supported on a rail which is itself supported by fixed support structure, and said rail is electrically insulated from said fixed support structure.

26. The apparatus of claim 23 wherein said structure grounding the support includes a cable, and said support means includes multiple supports for multiple edibles, the cable connected to said supports.

27. In apparatus for enhancing smoke treatment of edibles, the combination comprising
 (a) first means for dispersing smoke particles in a zone wherein the edibles are located, and means for inducing smoke particle flow to contact exposed undersides of the edibles, and to flow around and above the edibles,
 (b) other means including a source of high voltage and multiple pointed tips to which said voltage is applied for forwardly dispersing charged ions into the smoke flowing upwardly above the edibles with the ions carrying an electrical charge or charges causing smoke particles to be attracted back downwardly onto upper sides of the edibles,
 (c) and metallic structure having local contact with exposed underside portions of the edibles, said structure imparting a potential to the edibles to cause said smoke particles into which ions have been dispersed to be attracted to the upper sides of the edibles,
 (d) said tips arranged in spaced apart clusters and pointed toward the edibles so that the ions being dispersed enhance smoke particle flow onto the edibles,
 (e) said metallic structure including metallic grid structure supporting the edibles, the grid structure being electrically conductive, and
 (f) the smoke being dispersed by said first means into a lower region of said zone lower than the edibles, and the ions are dispersed by said tips into an upper region of said zone higher than the edibles, said smoke particle flow inducing means located in and openly exposed in said zone to displace the smoke and ions above the levels of the edibles, and in directions and at rates sufficient to enhance smoke particle flow onto the edibles, (g) and means forming a surface located in rearward proximity to said tips to provide distributed electrostatic charge at said surface and of the same polarity as said ions, thereby to enhance the forward dispersing of said ions.

28. The apparatus of claim 27 wherein said (g) means defines a plate located in proximity to a grounded metallic wall at a boundary of said zone.

* * * * *